(12) United States Patent
Zerbino

(10) Patent No.: US 12,473,020 B2
(45) Date of Patent: Nov. 18, 2025

(54) CONTROL SYSTEM AND CONTROL METHOD FOR A WORK VEHICLE

(71) Applicant: KUBOTA CORPORATION, Osaka (JP)

(72) Inventor: Fulvio Zerbino, Crepy-en-Valois (FR)

( * ) Notice: Subject to any disclaimer, the term of this patent is extended or adjusted under 35 U.S.C. 154(b) by 58 days.

(21) Appl. No.: 18/656,625

(22) Filed: May 7, 2024

(65) Prior Publication Data

US 2024/0375707 A1    Nov. 14, 2024

(30) Foreign Application Priority Data

May 9, 2023   (EP) ..................................... 23315175

(51) Int. Cl.
*B62D 6/00*   (2006.01)
(52) U.S. Cl.
CPC ...................... *B62D 6/00* (2013.01)
(58) Field of Classification Search
CPC ........................................ B62D 6/00
See application file for complete search history.

(56) References Cited

U.S. PATENT DOCUMENTS

2018/0310461 A1   11/2018   Shinkai et al.
2021/0146995 A1   5/2021    Miyashita et al.

FOREIGN PATENT DOCUMENTS

CN   114368391 A    4/2022
EP    3822148 A1    5/2021

OTHER PUBLICATIONS

English translation of CN114368391.

*Primary Examiner* — Mathew Franklin Gordon

(57) ABSTRACT

A control system for a work vehicle having a displacement device by which the work vehicle can travel, the control system comprising
a steering control unit configured to control the displacement device to execute steering instructions, the steering control unit being configured to receive first steering instructions from a first direction control unit and second steering instructions from a second direction control unit, and
a selector for selecting a first mode in which the steering control unit is to execute the first steering instructions and to ignore the second steering instructions, and a second mode in which the steering control unit is to execute the second steering instructions and to ignore the first steering instructions.

15 Claims, 3 Drawing Sheets

CONTROL SYSTEM AND CONTROL METHOD FOR A WORK VEHICLE

TECHNICAL FIELD

The present disclosure relates to the field of work vehicles, and more particularly to a control system and a control method for a work vehicle having a displacement device by which the work vehicle can travel, such as wheels or caterpillar tracks.

TECHNOLOGICAL BACKGROUND

In conventional designs, vehicles are steered by a steering wheel operated by a driver and located in the cabin of the vehicle. Recently, it has been proposed to steer the vehicle based on instructions sent by a control unit, in order to avoid the driver performing some tasks, especially the most repetitive or easy ones. Although such systems have proven satisfactory, there is still room for improvement.

SUMMARY

In this respect, the present disclosure relates to a control system for a work vehicle having a displacement device by which the work vehicle can travel, the control system comprising:
- a steering control unit configured to control the displacement device to execute steering instructions, the steering control unit being configured to receive first steering instructions from a first direction control unit and second steering instructions from a second direction control unit, and
- a selector for selecting a first mode in which the steering control unit is to execute the first steering instructions and to ignore the second steering instructions, and a second mode in which the steering control unit is to execute the second steering instructions and to ignore the first steering instructions.

A work vehicle is a vehicle capable of performing work in addition to the mere displacement of passengers or luggage, e.g. ground work, agricultural work, load lifting, etc. Work vehicles may be tractors, telehandlers, mobile cranes, lawn mowers, harvesting machines or other agricultural vehicles, etc.

As exemplified above, the displacement device includes the parts which enable the work vehicle to move with respect to the ground, such as wheels, caterpillar tracks and the like.

The steering control unit receives instructions from at least two direction control units, namely the first direction control unit and the second direction control unit. Hereinafter, an element (e.g. direction control unit, steering instructions, mode etc.) mentioned without "first" or "second" may indicate either one or both of the first element and the second element. Conversely, generic plural forms may stand for singular, as applicable.

The direction control units may be configured to digitally and/or automatically generate steering instructions, as opposed to a manual steering wheel. The direction control units may include one or more processors configured to generate the steering instructions.

When the steering control unit executes steering instructions, the steering control unit controls the displacement device such that the displacement of the work vehicle complies with the steering instructions. The steering control unit may convert the steering instructions from a format issued by the direction control units to a format executable by the displacement device.

The selector may be physical or digital. The selector may require a plurality of actions to actually perform the selection, e.g. several selections on a plurality of selection screens. The selector may be operable by an operator and/or a driver of the work vehicle. In particular, the selector may be provided on the work vehicle, e.g. in the work vehicle cabin. In a variant, the selector may be provided remote from the work vehicle, e.g. on a (portable or not) user terminal.

As per the proposed control system, the work vehicle can receive instruction not only from one but two or more direction control units, e.g. relating to different subsystems and/or accessories of the work vehicle, and the selector enables appropriate control of which one of the direction control units actually controls the steering of the work vehicle via the steering control unit. Therefore, the control system offers enhanced flexibility for controlling the work vehicle.

Optionally, the control system further comprises a first engagement switch and a second engagement switch configured to enable and restrict execution of the first steering instructions and the second steering instructions by the steering control unit, respectively. That is, the first engagement switch is configured to enable and restrict execution of the first steering instructions by the steering control unit, and the second engagement switch is configured to enable and restrict execution of the second steering instructions by the steering control unit. The engagement switches may be operable by an operator independently of the selector. However, the selector may have an influence on the engagements switches.

The engagement switches may be physical or digital. The engagement switches may require a plurality of actions to actually enable or restrict execution of steering instructions, e.g. several selections on a plurality of screens. The engagement switches may be operable by an operator and/or a driver of the work vehicle. In particular, the engagement switches may be provided on the work vehicle, e.g. in the work vehicle cabin. In a variant, the selector may be provided remote from the work vehicle, e.g. on a (portable or not) user terminal.

Optionally, the selector is configured to, in the first mode, activate the first engagement switch and deactivate the second engagement switch, and in the second mode, deactivate the first engagement switch and activate the second engagement switch. Hereinafter, the first engagement switch enables execution of the first steering instructions when activated, and restricts (or prevents) execution of the first steering instructions when deactivated. The same applies to the second engagement switch. However, for either engagement switch, the opposite situation is also encompassed.

Owing to such features, the selector ensures that the only one of the first steering instructions and the second steering instructions is effective, through the engagement switches.

Optionally, the control system is further configured to prevent activation of the second engagement switch while the first engagement switch is activated. That is, the first engagement switch has priority over the second engagement switch, and the second engagement switch cannot be activated until the first engagement switch is voluntarily deactivated. In this embodiment, should an operator wish to switch from the first mode to the second mode, the first mode must be deactivated before activating the second mode.

Optionally, the control system is further configured to deactivate the second engagement switch upon activation of the first engagement switch. That is, the first engagement switch overrides the second engagement switch.

Optionally, the control system is further configured to enable activation of the first engagement switch when the second engagement switch is activated. In other words, it is possible to directly switch from the second mode to the first mode by just operating the first engagement switch, without prior disabling of the second engagement switch.

Thanks to these provisions, priority rules between the first steering instructions and the second steering instructions can be appropriately implemented.

Optionally, the control system is further configured to send an ignore signal to the second direction control unit when the first engagement switch is activated. The ignore signal is configured to indicate to the second direction control unit that the second instructions are ignored. The ignore signal has an appropriate format depending on the second direction control unit. Thus, the second direction control unit can be made aware that the second steering instructions are ignored, and can react appropriately, e.g. by stopping issuing the second steering instructions to save calculation load.

Optionally, the selector is further configured to enable selection of a third mode, and the control system is configured to, in the third mode, enable activation of the first engagement switch and the second engagement switch, and to cause the steering control unit to execute the first steering instructions and to ignore the second steering instructions. The third mode corresponds to a neutral position of the selector, in which both the first engagement switch and the second engagement switch are available for activation. In this neutral position, by default, the first steering instructions are executed whereas the second steering instructions are ignored. In other words, by default, the steering control unit works like in the first mode, with the exception that any mode can be chosen or any engagement switch selected at any time.

The third mode may correspond to an actual selection and/or to a state in which neither the first mode nor the second mode has been selected. As the case may be, the selector may be a three-position physical switch.

Optionally, the selector comprises a display configured to display a selection screen when it is determined that both the first direction control unit and the second direction control unit are active. Hereinafter, "active" means that the direction control unit is in a state of sending steering instructions. When either one of the direction control units is not active, it is not necessary to offer selection to the operator. Thus, the operator is requested to select a mode only when appropriate.

As mentioned above with respect to the selector, the display may be an in-vehicle display or not. For instance, the display may be a remote display, e.g. a user terminal such as an operator's smartphone provided with the appropriate software (e.g. application).

In these embodiments, the third mode may correspond to ignoring the selection screen. Selection may be carried out by input means such as buttons, keys or a touch pad.

Optionally, the display is configured to display information representative of the selected mode. For instance, after selection, the display can display icons, drawings or text indicating which mode has been selected and/or which engagement switch remains operable.

Optionally, wherein the first direction control unit and the second direction control unit are configured to generate steering instructions based on calculation taking, as an input, a location of the work vehicle and a planned route of the work vehicle. Such direction control units are sometimes referred to as "autosteering" control units, because the directions are calculated without any operator intervening.

As outlined before, two autosteering devices on a work vehicle bring extra-flexibility for carrying out desired tasks.

Depending on the implementation, the direction control units may take further inputs, such as sensor data. For instance, if the location of the work vehicle is provided by a global navigation satellite system (GNSS) such as GPS, the direction control units may further take, as inputs, data to correct possible offsets of the GNSS-determined location. As another example, the direction control units may take, as an input, an angle and/or speed of the displacement device.

Optionally, the control system further comprises a killer switch configured to prevent the steering control unit from executing the first steering instructions and the second steering instructions. In such case, only manual steering remains available. The above remarks about implementation of the selector and the engagement switches apply mutatis mutandis to the killer switch.

Preventing the execution of steering instructions may be carried out in many ways, e.g. preventing the direction control units from issuing steering instructions, preventing the communication between the direction control units and the steering control unit, preventing the receiving of the steering instructions by the steering control unit, or yet making the steering control unit ignore any received steering instructions.

The present disclosure is further directed to a work vehicle comprising a displacement device, by which the work vehicle can travel, and the control system as described above.

Optionally, the first direction control unit and/or the second direction control unit is an on-board component of the work vehicle.

On-board means that the direction control unit is present on the work vehicle, as opposed to a remote unit. An on-board unit may be provided inside or outside the work vehicle. For instance, the second direction control unit may belong to a management unit of an implement (or more generally of a component external to the work vehicle), whereas the first direction control unit may belong to the vehicle navigation system. A direction control unit which is not on-board may be connected to the work vehicle in another way, e.g. through an appropriate wireless connection. In an embodiment, in order to carry out work by a plurality of work vehicles, a work vehicle may receive steering instructions from a direction control unit mounted on another work vehicle. Besides, an on-board direction control unit may be either integrated to the work vehicle or removably fixed to the work vehicle.

The present disclosure is further directed to a method for controlling a work vehicle comprising a displacement device by which the work vehicle can travel, wherein, given a steering control unit configured to control the displacement device to execute steering instructions, the steering control unit being configured to receive first steering instructions from a first direction control unit and second steering instructions from a second direction control unit, the method comprises operating a selector for selecting a first mode in which the steering control unit is to execute the first steering instructions and to ignore the second steering instructions, and a second mode in which the steering control unit is to execute the second steering instructions and to ignore the first steering instructions.

The method, hereinafter referred to as the control method, may be computer-implemented and may have any of the features described above with respect to the control system.

The present disclosure is further related to a computer program set including instructions for executing the steps of the above described control method when said program set is executed by at least one computer. This program can use any programming language and take the form of source code, object code or a code intermediate between source code and object code, such as a partially compiled form, or any other desirable form.

The present disclosure is further related to a recording medium readable by a computer and having recorded thereon at least one computer program including instructions for executing the steps of the above described control method. The recording medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the recording medium can be an integrated circuit in which the program is incorporated, the circuit being adapted to execute the method in question or to be used in its execution.

BRIEF DESCRIPTION OF THE DRAWINGS

The invention and advantages thereof will be better understood upon reading the detailed description which follows, of embodiments given as non-limiting examples. This description refers to the appended drawings, wherein.

DETAILED DESCRIPTION OF EMBODIMENTS

Figure 1:
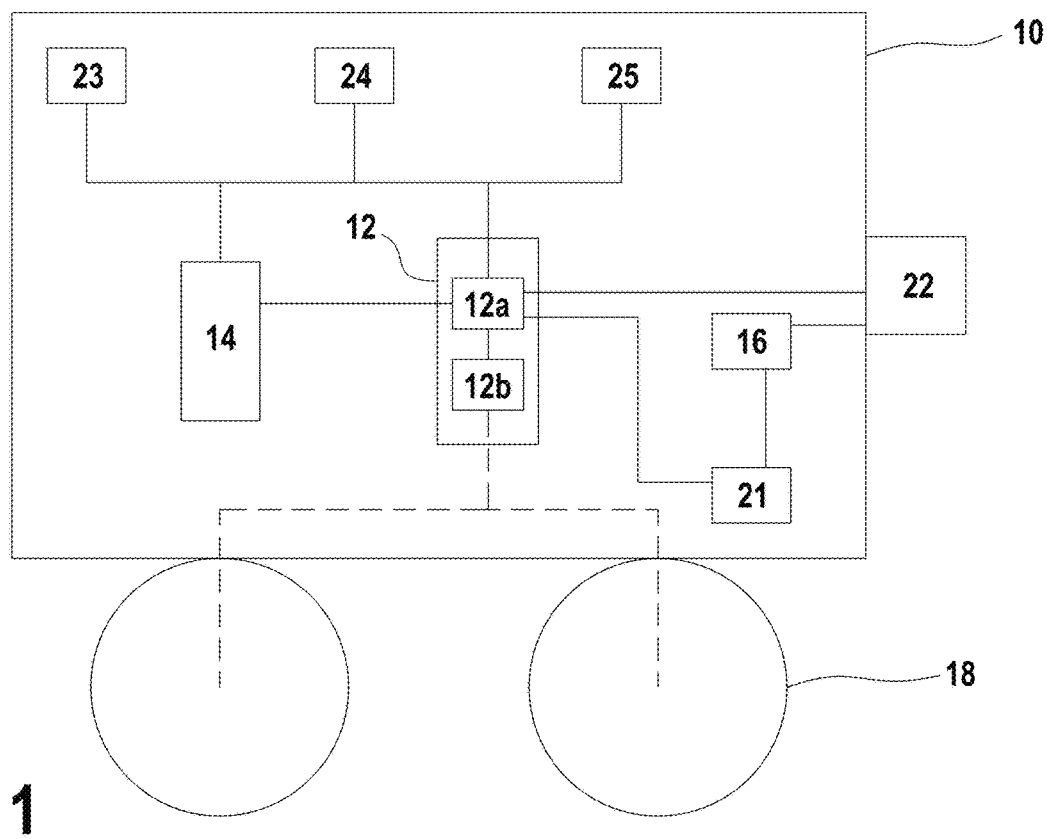
FIG. 1 is a diagram showing a control system and a work vehicle in an embodiment.

A work vehicle 10 according to an embodiment is diagrammatically illustrated in FIG. 1. The work vehicle 10 comprises a displacement device 18 by which the work vehicle 10 can travel. In this embodiment, the displacement device 18 is represented as wheels (also referred to wheels 18 hereinafter) but any displacement device, e.g. caterpillar tracks, is encompassed.

More generally, the work vehicle 10 can be any vehicle capable of performing work, as detailed above.

FIG. 1 further illustrates a control system for the work vehicle 10. In this embodiment, the control system is shown on-board the work vehicle 10, but the control system could be partly or fully provided as a remote system. The control system aims to control a direction of displacement (e.g. steering) of the work vehicle 10, through the displacement device 18. The connecting lines drawn in FIG. 1 show the functional relationship between the various components, but preclude neither that the components are not physically connected to one another (but e.g. wirelessly) nor that the components are connected to one another through other intermediate and non-illustrated modules.

The control system comprises a steering control unit 12 and a selector 14. The steering control unit 12 and/or the selector 14 may be implemented as hardware or software to carry out the functions detailed below. Once the functions as described below are given, implementation per se is within the skilled person's abilities.

One or more sensors, shown collectively under reference 16, may be provided on the work vehicle 10 and/or remotely in order to provide data about the work vehicle 10. For instance, the sensors 16 may include any one of a position sensor, an attitude sensor, a wheel angle sensor, etc.

The position sensor may be configured to determine a current position of the work vehicle 10. In an embodiment, the position sensor may include a GNSS device such as a GPS receiver, a differential GPS receiver, a GPS receiver coupled with a Real Time Kinematic (RTK) system, etc.

The attitude sensor may be configured to sense at least one of the heading and tilt of the work vehicle 10. The attitude sensor may include a tilt sensor and/or a gyroscope. The attitude sensor may be configured to correct possible offsets or drifts of said position.

The wheel angle sensor may be configured to sense an angle of one or more of the wheels 18 with respect to a reference direction. The wheel angle sensor may be attached to an axle of the wheels 18. The wheel angle sensor may be configured to provide feedback about the actual steering directions of the wheels 18.

The steering control unit 12 is configured to control the displacement device 18, e.g. the wheels, to execute steering instructions. For instance, the steering control unit 12 may control a motor attached to a steering column of the work vehicle 10, in order to physically turn the steering column, and, as a consequence, the steering wheel. In another example, the steering control unit 12 may control a valve block fluidly connected to a hydraulic steering system of the work vehicle 10. Other embodiments are also possible.

In this embodiment, the steering control unit 12 receives the steering instructions from a plurality of direction control units. Specifically, the steering control unit 12 may receive first steering instructions from a first direction control unit 21 and second steering instructions from a second direction control unit 22.

In an embodiment, the steering control unit 12 may comprise a plurality of components, such as a decision module 12a and an execution module 12b. The decision module 12a may receive the steering instructions from the direction control units 21, 22, and decide which steering instructions are to be executed. This decision may be made based on the mode selected by the selector 14, among others. The decision module 12a may then forward the steering instructions to be executed to the execution module 12b. In this way, the execution module 12b receives only one type of instructions at a time. The execution module 12b executes the received instructions, e.g. as described above. The decision module 12a and the execution module 12b may be formed as a single unit or as separate units.

As mentioned above, the first direction control unit 21 and the second direction control unit 22 may be configured to generate their respective steering instructions based on calculation. The calculation may take, as an input, a location or position of the work vehicle 10 and a planned route of the work vehicle 10. More generally, the calculation may take any necessary input, e.g. obtainable through one or more of the sensors 16.

That is, in this embodiment, the first direction control unit 21 and the second direction control unit 22 are so-called autosteering controllers. Based on the current location of the work vehicle 10 and the planned route, e.g. a trajectory that the work vehicle 10 is to follow, the first and second direction control units 21, 22 calculate instructions for operating the wheels 18 such that the work vehicle 10 follows the planned route. The first direction control unit 21 and the second direction control unit 22 may issue different steering instructions, based on the possibly different objectives and constraints they have.

The first direction control unit 21 may be an on-board component of the work vehicle 10, or not. As an example, the first direction control unit 21 may belong to a navigation system of the work vehicle 10. The navigation system may be provided by the work vehicle manufacturer or by a third-party. In an embodiment, the first direction control unit 21 may be integrated in the work vehicle 10 and inseparable from the work vehicle 10 in a nominal operation thereof.

The second direction control unit 22 may be an on-board component of the work vehicle 10, or not. As an example, the second direction control unit 22 may belong to a component external to the work vehicle 10 such as a management unit of an implement. The management unit may be located inside the work vehicle 10 (e.g. in a cabin), outside the work vehicle 10 (e.g. on the roof or beneath the work vehicle 10) or on the implement itself. The implement may be used for the work vehicle 10 to perform a particular task. In the example of FIG. 1, the second direction control unit 22 is shown attached to the exterior of the work vehicle 10, but the second direction control unit 22 could be provided inside the work vehicle 10, or still as a remote component connected wirelessly to the work vehicle 10.

Switches 23, 24, 25 may be provided in order to control which steering instructions are executed by the steering control unit 12. Specifically, a first engagement switch 23 is configured to enable and restrict execution of the first steering instructions. That is, when the first engagement switch 23 is activated, the steering control unit 12 controls the displacement device 18 as per the first steering instructions, and when the first engagement switch 23 is deactivated, the steering control unit 12 does not control the displacement device 18 as per the first steering instructions (e.g., ignores the first steering instructions). For instance, the first engagement switch 23 may send a signal to the decision module 12a, and the decision module 12a controls the displacement device 18 accordingly to enable or prevent execution of the first steering instructions.

Likewise, a second engagement switch 24 is configured to enable and restrict execution of the second steering instructions. That is, when the second engagement switch 24 is activated, the steering control unit 12 controls the displacement device 18 as per the second steering instructions, and when the second engagement switch 24 is deactivated, the steering control unit 12 does not controls the displacement device 18 as per the second steering instructions (e.g., ignores the second steering instructions). For instance, the second engagement switch 24 may send a signal to the decision module 12a, and the decision module 12a controls the displacement device 18 accordingly to enable or prevent execution of the second steering instructions.

A killer switch 25 is configured to prevent the steering control unit 12 from executing the first steering instructions and the second steering instructions. The killer switch 25 may be connected to the decision module 12a.

The switches 23, 24, 25 may be implemented by means known per se in the art, e.g. as physical or digital switches.

The selector 14 enables selection between at least two, here three modes which are described in greater detail with respect to FIGS. 2-5. The modes may be implemented by the steering control unit 12 based on the selection made by the selector 14.

In an embodiment, the selector 14 comprises a display. The display may display a selection screen when it is determined that both the first direction control unit and the second direction control unit are active. The display may offer the operator a choice between a first mode and a second mode. If the operator does not choose between the first mode and the second mode, the selector 14 remains, by default, in a third mode. Irrespective of the possible input function of the display, the display may be configured to display which mode is selected, or when a change of mode occurs.

FIGS. 2 to 5 show the same diagram as FIG. 1, with highlights according to the selected mode. In all modes, it is assumed that both the first direction control unit 21 and the second direction control unit 22 are active, i.e. susceptible to generate steering instructions. The selector 14 basically enables to rule the execution of competing and possibly contradictory steering instructions. However, in variants, it is not necessary that both the first direction control unit 21 and the second direction control unit 22 be active. For instance, the steering control unit 12 may send a signal to any one of the first direction control unit 21 and the second direction control unit 22 not to send steering instructions, based on the mode selected by the selector 14, e.g. via the ignore signal described below.

Figure 2:
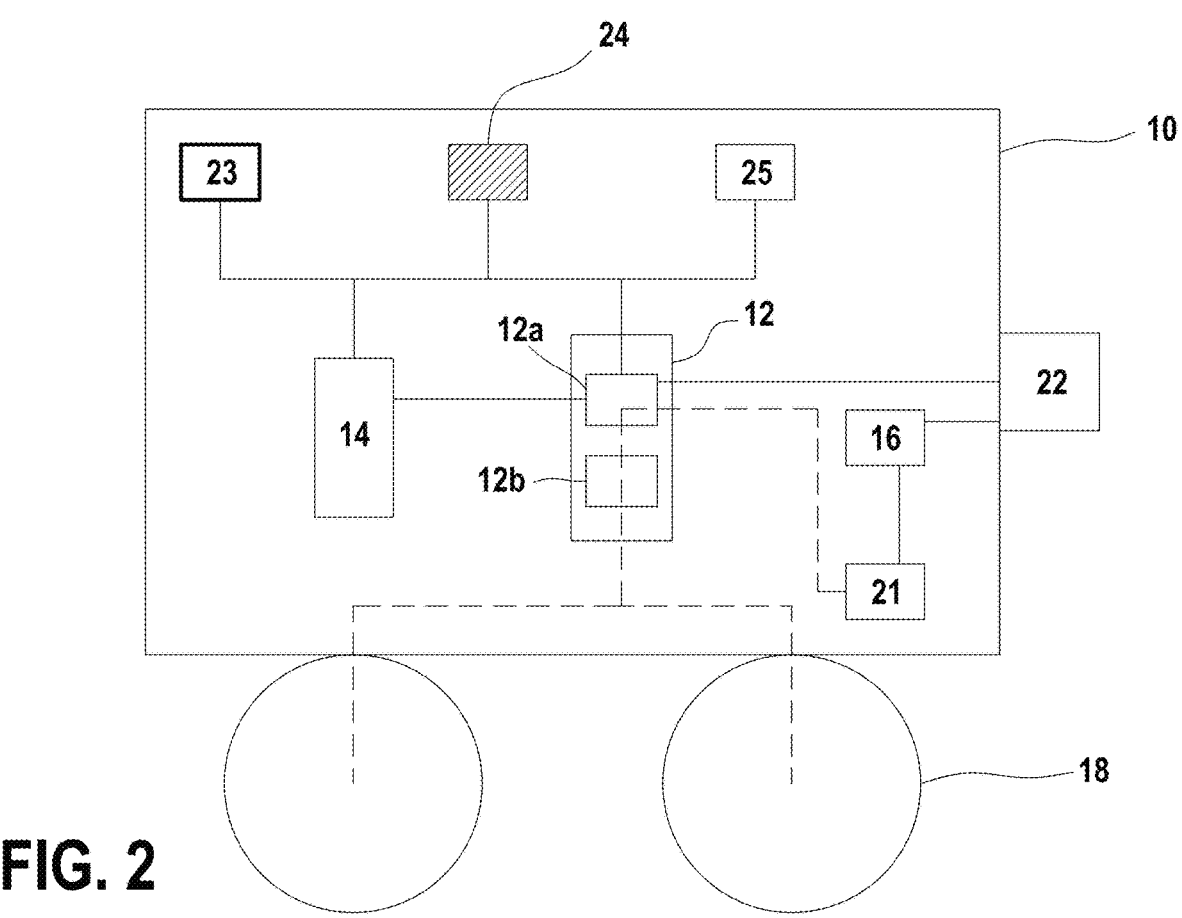
FIG. 2 is the diagram of FIG. 1, showing operation of the control system of FIG. 1 in a first mode.

FIG. 2 illustrates operation the control system in a first mode which can be chosen by an operator through the selector 14. In the first mode, the steering control unit 12 is to execute the first steering instructions and to ignore the second steering instructions. If the above-described switches are provided, the selector 14 turned to the first mode may activate the first engagement switch 23 and deactivate the second engagement switch 24.

As shown in FIG. 2, the steering instructions from the first direction control unit 21 are transmitted to the wheels 18 through the steering control unit 12. Specifically, the decision module 12a may be configured, upon instructions from the selector 14 to operate in the first mode, to transmit the steering instructions from the first direction control unit 21 to the execution module 12b, and the execution module 12b controls the wheels 18 accordingly. As mentioned above, the steering control unit 12 may process the first steering instructions before transmitting them to the wheels 18.

Activation of the second engagement switch 24 may be prevented while the first engagement switch is activated, which is why the second engagement switch 24 is shown hatched in FIG. 2. That is, the first engagement switch 23 has priority over the second engagement switch 24, and the second engagement switch 24 itself cannot be reactivated until the first engagement switch 23 has been deactivated. Inability to activate the second engagement switch 24 may be shown in any manner, e.g. by switching on or off a backlight of the second engagement switch 24 (in case of a physical switch), or by displaying an interdiction sign on top of the second engagement switch 24 (in case of a digital switch).

The control system, in particular the steering control unit 12 and in particular the decision module 12a, may be configured to send an ignore signal to the second direction control unit 22 when the first engagement switch 23 is activated, or more generally when the selector 14 selects the first mode. Thus, the second direction control unit 22 may adapt its operation, knowing that the second steering instruction will anyway not be executed.

Figure 3:
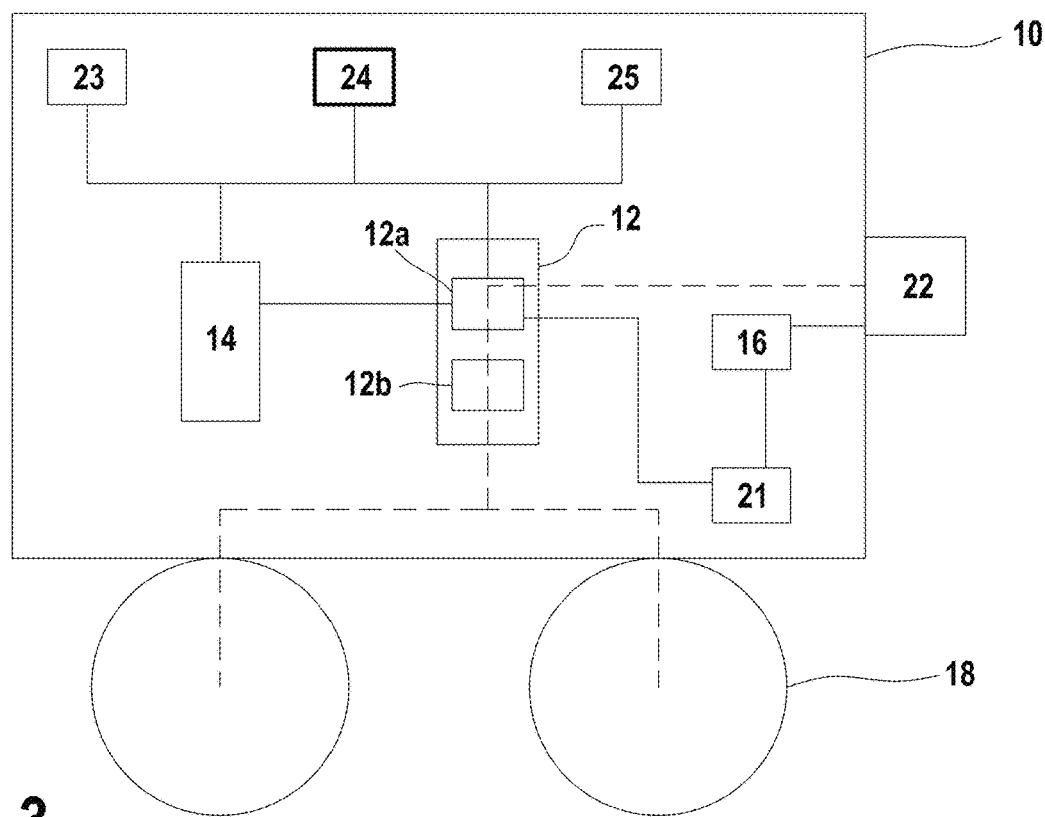
FIG. 3 is the diagram of FIG. 1, showing operation of the control system of FIG. 1 in a second mode.

FIG. 3 illustrates operation the control system in a second mode which can be chosen by an operator through the selector 14. In the second mode, the steering control unit 12 is to execute the second steering instructions and to ignore the first steering instructions. If the above-described switches are provided, the selector 14 turned to the second mode may deactivate the first engagement switch 23 and activate the second engagement switch 24.

As shown in FIG. 3, the steering instructions from the second direction control unit 22 are transmitted to the wheels 18 through the steering control unit 12. Specifically, the decision module 12a may be configured, upon instructions from the selector 14 to operate in the second mode, to transmit the steering instructions from the second direction control unit 22 to the execution module 12b, and the execution module 12b controls the wheels 18 accordingly. As mentioned above, the steering control unit 12 may process the second steering instructions before transmitting them to the wheels 18.

Contrary to FIG. 2, in FIG. 3, the first engagement switch 23 is not hatched. This is because, in this example, the control system is configured to enable activation of the first engagement switch 23 despite the second engagement switch 24 being activated.

If a high level of priority is desired for the first steering instructions, the control system may be configured to deactivate the second engagement switch 24 upon activation of the first engagement switch 23. In doing so, the operator would go back from the configuration of FIG. 3 to the configuration discussed with reference to FIG. 2.

Figure 4:
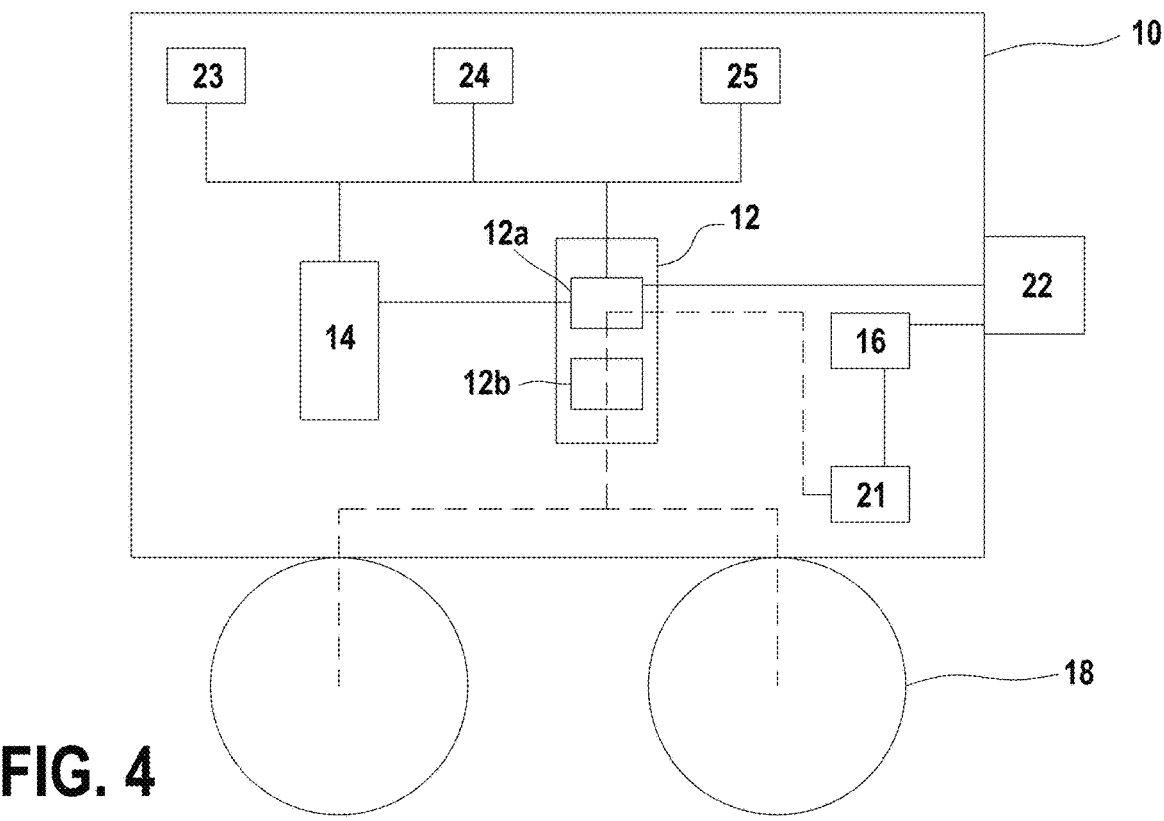
FIG. 4 is the diagram of FIG. 1, showing operation of the control system of FIG. 1 in a third mode.

FIG. 4 illustrates operation the control system in a third mode which can be chosen by an operator through the selector 14. In this example, as previously described, the third mode needs not be selected explicitly, and may correspond to a neutral position of the selector 14. For instance, if the selector 14 displays a popup window when it is determined that both the first direction control unit 21 and the second direction control unit 22 are active, the operator ignoring or closing the popup window without an explicit selection may result in the selector 14 selecting the third mode.

The third mode is similar to the first mode described with reference to FIG. 2 and will not be described in detail again, apart from the following differences. In the third mode, the control system is configured to cause the steering control unit 12 to execute the first steering instructions and to ignore the second steering instructions, like in the first mode. However, unlike the first mode, the control system is configured to enable activation of the first engagement switch 23 and the second engagement switch 24. With reference to FIG. 4, although the steering control unit 12 executes the first steering instructions, both the first engagement switch 23 and the second engagement switch 24 remain available for activation. Upon activation of either engagement switch, or upon selection of the first mode or the second mode, the control system can control the work vehicle as previously described with reference to FIGS. 2 and 3.

Figure 5:
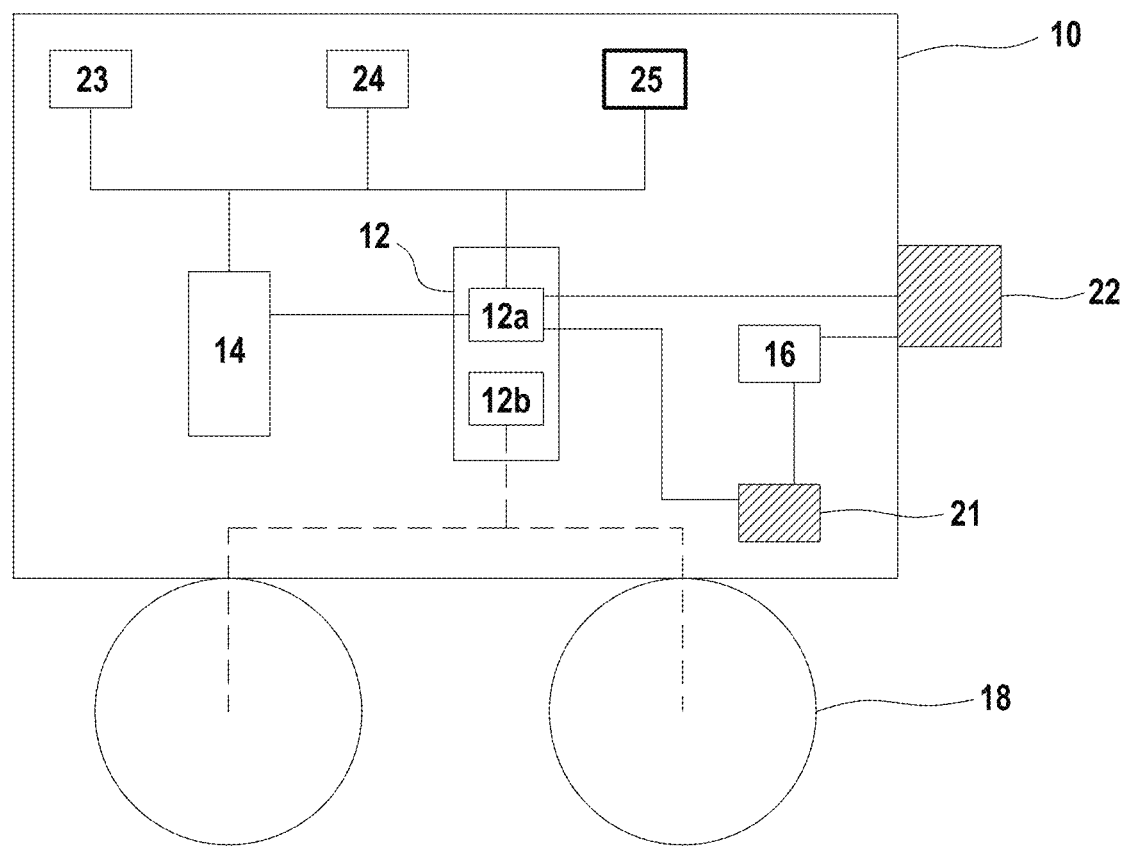
FIG. 5 is the diagram of FIG. 1, showing operation of the control system of FIG. 1 in a killer mode.

FIG. 5 shows operation of the control system in a killer mode. The killer mode is a mode in which the killer switch 25 is activated. As mentioned above, the killer switch 25 prevents, when activated, the steering control unit 12 from executing the first steering instructions and the second steering instructions. As shown in FIG. 5, in this embodiment, the killing mode is implemented by preventing the first direction control unit 21 and the second direction control unit 22 from issuing steering instructions when the killer switch 25 is activated. However, as discussed above, other embodiments are encompassed.

The present disclosure is further directed to a method for controlling a work vehicle 10 comprising a displacement device 18 by which the work vehicle 10 can travel, wherein, given a steering control unit 12 configured to control the displacement device 18 to execute steering instructions, the steering control unit 12 being configured to receive first steering instructions from a first direction control unit 21 and second steering instructions from a second direction control unit 22, the method comprises operating a selector 14 for selecting a first mode in which the steering control unit 12 is to execute the first steering instructions and to ignore the second steering instructions, and a second mode in which the steering control unit 12 is to execute the second steering instructions and to ignore the first steering instructions. Although presented with respect to a particular embodiment of the work vehicle 10, the method may be implemented on other types of control systems.

Although the present disclosure refers to specific exemplary embodiments, modifications may be provided to these examples without departing from the general scope of the invention as defined by the claims. For instance, although the different modes have been presented with reference to engagement switches 23, 24, such switches are not necessary, e.g. if the operator should not be able to choose between the steering instructions source outside of the selector 14. Besides, although represented as different components, the selector 14, the first engagement switch 23, the second engagement switch 24 and/or the killer switch 25 may be embodied by a common human machine interface. Conversely, items presented herein as single units, e.g. the steering control unit 12 or the engagement switches 23, 24, may be embodied by a plurality of components.

Besides, although an example of configuration of the steering control unit 12 has been detailed above, other configurations are envisaged, including but not limited to the following one: for instance, the decision module 12a may be configured, upon instructions from the selector 14 to operate in the first mode, to allow (e.g. direct) transmission of the steering instructions from the first direction control unit 21 to the execution module 12b. In this variant, the first direction control unit 21 may not send steering instructions to the decision module 12a, but may receive an enabling signal from the decision module 12a in order to send steering instructions to the execution module 12b. Irrespective of whether this variant applies to the first mode, the same variant may apply or not to the second mode and the second direction control unit 22, mutatis mutandis.

In an embodiment in which the variant applies to the first mode but not to the second mode, the decision module 12a may be configured, upon instructions from the selector 14 to operate in the first mode, to filter out the steering instructions received from the second direction control unit 22, and upon instructions from the selector 14 to operate in the second mode, to transmit the steering instructions from the second direction control unit 22 to the execution module 12b and not to send the enabling signal to the first direction control unit 21.

More generally, individual characteristics of the different illustrated/mentioned embodiments may be combined in additional embodiments. Therefore, the description and the drawings should be considered in an illustrative rather than in a restrictive sense.

The invention claimed is:

1. A control system for a work vehicle having a displacement device by which the work vehicle can travel, the control system comprising
    a steering control unit configured to control the displacement device to execute steering instructions, the steering control unit being configured to receive first steering instructions from a first direction control unit and second steering instructions from a second direction control unit, and a selector for selecting a first mode in which the steering control unit is to execute the first steering instructions and to ignore the second steering instructions, and a second mode in which the steering control unit is to execute the second steering instructions and to ignore the first steering instructions.

2. The control system as claimed in claim 1, further comprising a first engagement switch and a second engagement switch configured to enable and restrict execution of the first steering instructions and the second steering instructions by the steering control unit, respectively.

3. The control system as claimed in claim 2, wherein the selector is configured to, in the first mode, activate the first engagement switch and deactivate the second engagement switch, and in the second mode, deactivate the first engagement switch and activate the second engagement switch.

4. The control system as claimed in claim 2, further configured to prevent activation of the second engagement switch while the first engagement switch is activated, and optionally configured to deactivate the second engagement switch upon activation of the first engagement switch.

5. The control system as claimed in claim 2, further configured to enable activation of the first engagement switch when the second engagement switch is activated.

6. The control system as claimed in claim 2, further configured to send an ignore signal to the second direction control unit when the first engagement switch is activated.

7. The control system as claimed in claim 2, wherein the selector is further configured to enable selection of a third mode, and the control system is configured to, in the third mode, enable activation of the first engagement switch and the second engagement switch, and to cause the steering control unit to execute the first steering instructions and to ignore the second steering instructions.

8. The control system as claimed in claim 1, wherein the selector comprises a display configured to display a selection screen when it is determined that both the first direction control unit and the second direction control unit are active.

9. The control system as claimed in claim 1, wherein the first direction control unit and the second direction control unit are configured to generate steering instructions based on calculation taking, as an input, a location of the work vehicle and a planned route of the work vehicle.

10. The control system as claimed in claim 1, further comprising a killer switch configured to prevent the steering control unit from executing the first steering instructions and the second steering instructions.

11. A work vehicle comprising a displacement device, by which the work vehicle can travel, and the control system as claimed in claim 1.

12. The work vehicle as claimed in claim 11, wherein the first direction control unit, and optionally the second direction control unit, is an on-board component of the work vehicle.

13. A method for controlling a work vehicle comprising a displacement device by which the work vehicle can travel, wherein, given a steering control unit configured to control the displacement device to execute steering instructions, the steering control unit being configured to receive first steering instructions from a first direction control unit and second steering instructions from a second direction control unit, the method comprises operating a selector for selecting a first mode in which the steering control unit is to execute the first steering instructions and to ignore the second steering instructions, and a second mode in which the steering control unit is to execute the second steering instructions and to ignore the first steering instructions.

14. A computer program set including instructions for executing the steps of the method as claimed in claim 13 when said program set is executed by at least one computer.

15. A recording medium readable by a computer and having recorded thereon a computer program set including instructions for executing the steps of the method as claimed in claim 13.

* * * * *